INVENTORS.
ALVIN E. BROWN
JESSE R. FIELD

INVENTORS.
ALVIN E. BROWN
JESSE R. FIELD

INVENTORS.
ALVIN E. BROWN
JESSE R. FIELD
BY
George C Sullivan
Agent

United States Patent Office 3,216,261
Patented Nov. 9, 1965

3,216,261
APPARATUS FOR COUNTING PULSES
Alvin E. Brown and Jesse R. Field, Sunnyvale, Calif., assignors to Lockheed Aircraft Corporation, Burbank, Calif.
Original application July 13, 1961, Ser. No. 123,697. Divided and this application Aug. 18, 1964, Ser. No. 395,638
3 Claims. (Cl. 74—1.5)

This is a division of application Serial Number 123,697, filed July 13, 1961, now abandoned. This invention relates to apparatus for counting pulses and more particularly to apparatus for counting the number of times a human heart beats in any preselected period of time.

In order to properly test a human heart it is desirable to count the total number of heart beats over a long period of time without interfering with the normal activities of the person under test. All prior devices for this purpose of which we have knowledge are large and complex so as to render them non-portable or are sensitive to noise and mechanical shock so as to impair their accuracy.

Therefore it is an object of our invention to provide apparatus for counting the number of heart beats during any desired period which apparatus is compact and portable so as not to interfere with the normal activities of the subject under test.

Another object of our invention is to provide apparatus for measuring the number of times a heart beats during a preselected period which apparatus is insensitive to noise.

A further object is to provide apparatus for counting recurrent electrical pulses which apparatus is very small and portable.

Yet another object is to provide apparatus for counting recurrent electrical pulses which apparatus is insensitive to mechanical shock.

Still another object is to provide apparatus for counting recurrent electrical pulses which requires very little energy from the electrical pulse source.

An additional object is to provide apparatus for amplifying a series of recurrent electrical pulses which apparatus is insensitive to noise.

These and other objects will be more apparent after referring to the following specification and attached drawings in which.

Figure 1:
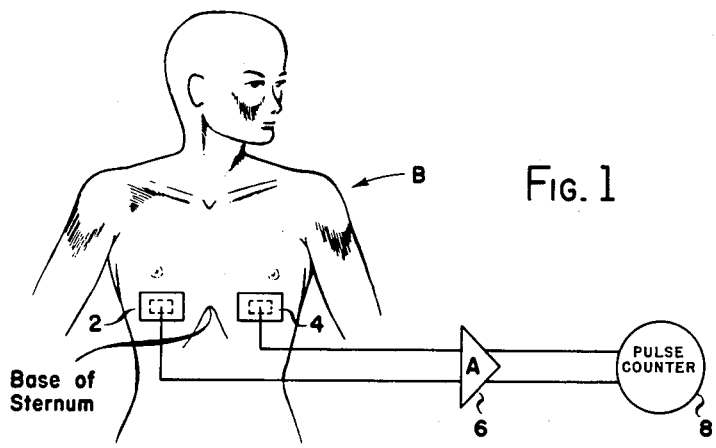
FIGURE 1 is a diagrammatic view of apparatus made in accordance with our invention attached to the torso of a human being for counting the number of beats of the heart of the human being.
Figure 2:
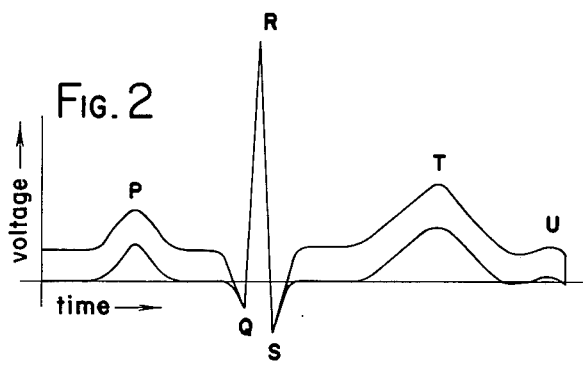
FIGURE 2 is a graph of the electrocardiograph potential generated by a typical human heart versus time.
Figure 3:
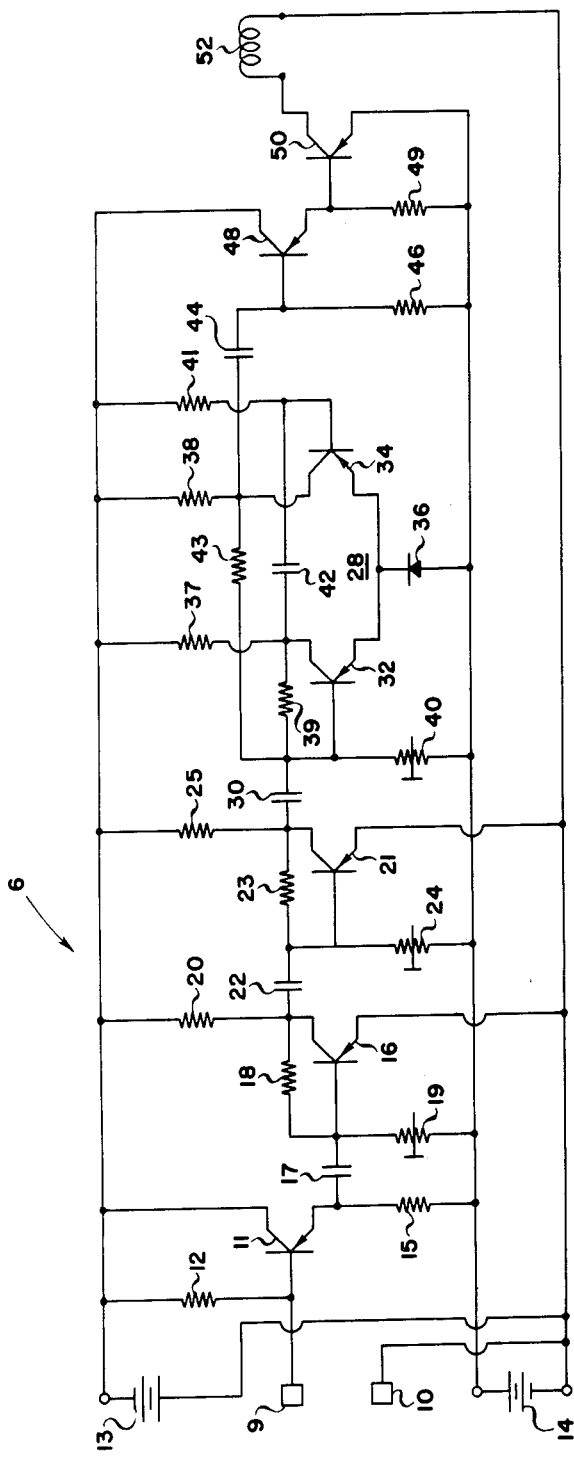
FIGURE 3 is a schematic diagram of a preferred embodiment of an amplifying unit of our invention.

Referring more particularly to the drawings, reference numeral 2 indicates an electrode attached to the right side of the chest of a human body B and reference numeral 4 indicates an electrode attached to the left side of the chest of the body B. The electrodes 2 and 4 may be any suitable devices such as small pieces of lead foil held to the body by adhesive tape. We prefer to attach the electrodes 2 and 4 on opposite sides of the base of the sternum with a separation therebetween of approximately six inches in order to obtain the maximum electrical signal for each heartbeat. Electrodes 2 and 4 are connected to an amplifying and noise discriminating unit 6, the output of which is connected to a pulse counter 8. Thus, each time the heart beats a signal is generated between electrodes 2 and 4 which is amplified by the amplifier 6 and counted by pulse counter 8. In FIGURE 2 is shown the well-known electrocardiographic signal produced between electrodes 2 and 4 each time the heart pulses. We prefer to disregard the low frequency harmonic components P, T and U and utilize only the QRS complex which has a greater amplitude and contains harmonic components of higher frequencies than the remainder of the signal. For amplifying only the QRS complex of the wave we have invented an amplifying unit, a preferred embodiment of which is shown in FIGURE 3. An input terminal 9 is provided to which electrode 4 is connected and an input terminal 10 is provided to which electrode 2 is connected. Input terminals 9 and 10 are connected to a transistor amplifier 11 arranged in an emitter-follower configuration and having an input impedance matching that between electrodes 2 and 4. Transistor amplifier 11 is provided with a base biasing resistor 12 connected in a manner well-known by those skilled in the art to the negative terminal of a battery 13, the positive terminal of which is grounded. The emitter of transistor 11 is connected to the positive terminal of a battery 14 through an emitter biasing resistor 15. The negative terminal of battery 14 is grounded. The output of amplifier 11 is connected to the input of a transistor amplifier 16 through a capacitor 17 which passes only the higher frequency components of the electrocardiographic signal. Transistor amplifier 16 is provided with a biasing resistor 18 in series with a thermistor 19 for temperature compensation which bias the base. Transistor 16 obtains its collector potential from battery 13 through a resistor 20. The output of amplifier 16 is connected to a second amplifier 21 through a capacitor 22 which capacitor passes only the higher frequency components of the electrocardiographic signal. The base biasing network for transistor amplifier 21 has a resistor 23 in series with a thermistor 24 for temperature compensation. Transistor 21 obtains its collector potential from battery 13 through resistor 25. The output of amplifier 21 is connected to a monostable multivibrator 28 through a capacitor 30 which passes only the higher frequency components of the electrocardiographic signal. Multivibrator 28 has two transistors 32 and 34 with common emitter connections to a diode 36 which provides both the proper biasing potential to the transistors and temperature compensation. Transistors 32 and 34 obtain their collector potentials from battery 13 through resistors 37 and 38, respectively. The base biasing network of transistor 32 is provided with a resistor 39 in series with a thermistor 40 which offers further temperature compensation to multivibrator 28. The base of transistor 34 is provided with biasing potential from battery 13 through a resistor 41. The output or collector of transistor 32 is connected to the input or base of transistor 34 through a capacitor 42 and the output or collector of transistor 34 is connected to the input or base of transistor 32 through a resistor 43. As is well-known by those skilled in the art, a monostable multivibrator generates an output pulse or on-time having a certain preselected time duration when a pulse of short duration is fed to its input. The duration of the output pulse of multivibrator 28 is determined by selection of resistor 41 and capacitor 42 having appropriate values. The output of multivibrator 28 is fed to a differentiator circuit comprising a capacitor 44 in series with a resistor 46 which functions in a conventional manner to provide a short pulse at the beginning of the output pulse of multivibrator 28 and a short pulse of opposite polarity at the end of the output pulse of multivibrator 28. The pulses produced by the differentiator circuit are fed to the base of the transistor 48 which is biased such that it will pass only the negative-going pulses from the differentiator circuit which in this example correspond to the leading edge of the output pulse of multivibrator 28. Transistor 48 is provided with emitter biasing resistor 49 and has its output connected to the input of a transistor amplifier 50. Connected to the output of the amplifier 50 is a load 52 which may be any suitable pulse counter.

The operation of our amplifier is as follows: as a given electrocardiographic signal is amplified through transistors 11, 16 and 21, the low frequency components of the electrocardiographic signal are eliminated due to the cumulative effect of capacitors 17, 22 and 30 which discriminate against the low frequency portion of the signal. Thus, at the input of multivibrator 28 there will appear a single pulse for each heartbeat. By appropriate selection of resistor 41 and capacitor 42 the duration of the output signal of the multivibrator 28 is adjusted to be only slightly less than the period between two successive heartbeats for a heart beating at the maximum rate which can be expected. Because a human heart rarely, if ever, exceeds a rate of 150 beats per minute, we prefer to select the values of resistor 41 and capacitor 42 such that the multivibrator 28 has an output pulse with a duration of about 300 milliseconds. Therefore, once multivibrator 28 is turned on by the pulse any subsequent noise pulses will have no effect upon multivibrator 28. Such is the case since transistor 32 which is normally cut off is turned on by pulses fed to its base and remains on for about 300 milliseconds so that any noise pulses during this period which are fed in will not be manifested in the output of multivibrator 28. Should a noise pulse occur during the time when transistor 32 is cut off, multivibrator 28 will be triggered and the next heart pulse will not be manifested in the output of multivibrator 28. When the square wave output of multivibrator 28 is fed through the differentiator circuit made up of capacitor 44 and resistor 46 a negative-going pulse and a positive-going pulse will be generated at the base of transistor 48 for each square wave from multivibrator 28. The leading edge of the positive-going pulse at the base of transistor 48 will tend to cut off transistor 48 to a greater extent and therefore will not affect the output of transistor 48. However, the leading edge of the negative-going pulse into the base of transistor 48 will forward bias the emitter junction and cause a signal to appear at the base of transistor 50 which signal will be amplified and driven through the load 52. Thus, a count of the pulses through load 52 will be a count of the number of heartbeats sensed by electrodes 2 and 4.

Figure 6:
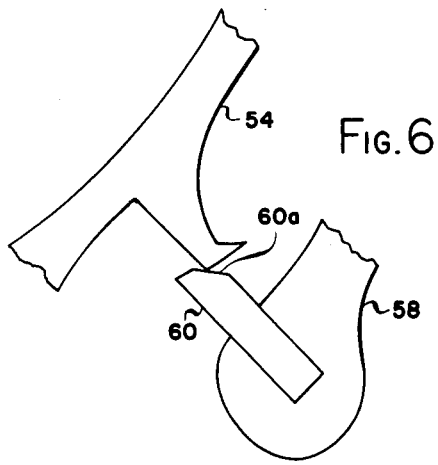
FIGURE 6 is an enlarged view of a portion of FIGURE 4.
Figure 4:
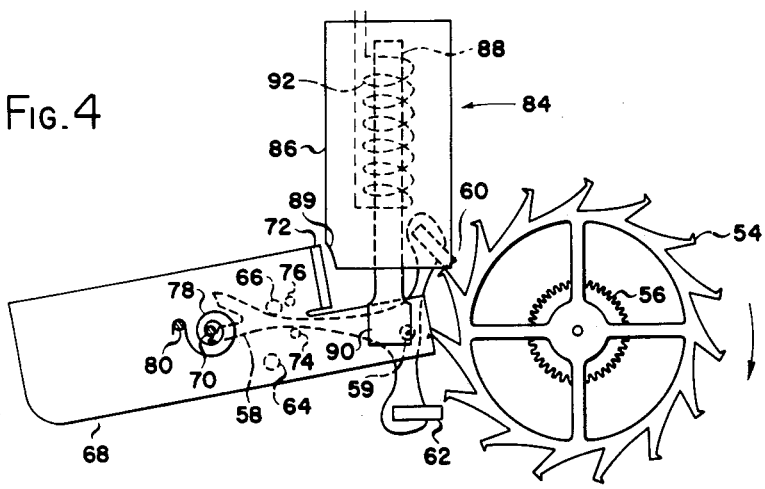
FIGURE 4 is a view taken at line 4—4 of FIGURE 5.
Figure 5:
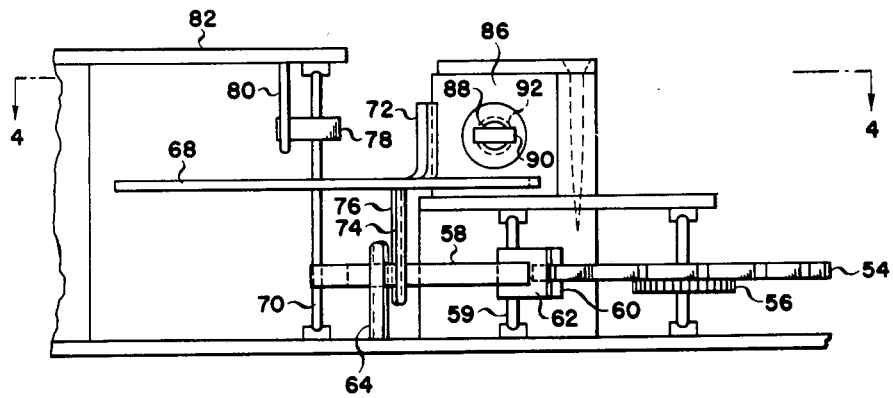
FIGURE 5 is a view of a portion of a conventional watch movement modified in accordance with our invention.

We have invented a modification for a conventional wristwatch which will enable the watch to function as a pulse counter and which when used with the amplifier described above will provide a completely portable heartbeat counter which is insensitive to noise and mechanical shock. Referring to FIGURES 4 and 5 a conventional escape wheel 54 is shown having a pinion 56 attached thereto which is driven from a conventional main spring (not shown) through a series of conventional gears (not shown). A conventional pallet lever 58 having a left pallet stone 60 and a right pallet stone 62 thereon is provided such that as pallet lever 58 pivots on shaft 59, the pallet stones 60 and 62 alternately engage the teeth on the periphery of escape wheel 54. We have modified the left pallet stone 60 by grinding off the corner of the entering face 60a thereof, as shown in FIGURE 6, so as to prevent any locking action between the surface of the tooth of escape wheel 54 and the face 60a. Banking pins 64 and 66 are provided in a conventional manner to restrict the pivotal movement of pallet lever 58. We have replaced the normal balance wheel and staff of a conventional watch with a balance member 68 which may be constructed of any magnetic material, preferably soft iron. Balance member 68 is attached to a shaft 70 which is pivotally mounted in conventional bearings and one end of balance member 68 is bifurcated with one bifurcation 72 bent upwardly at 90 degrees to the surface of balance member 68. Attached to the bottom surface of balance member 68 are two pins or projections 74 and 76 which are positioned astraddle the pallet lever 58. A conventional hair spring 78 has one end attached to shaft 70 and the other end engaged around a pin 80 depending from a conventional balance cock 82. Spring 78 is arranged so as to urge balance member 68 to rotate in a direction tending to cause pin 76 to press against pallet lever 58. Balance member 68 is preferably statically balanced by removing an appropriate amount of the material from the end opposite the bifurcated end so as to make it insensitive to mechanical shock. An electromagnet 84 is provided and has a housing 86 appropriately drilled to receive a core 88. The housing 86 and core 88 may be made of any magnetic material, preferably soft iron. Housing 86 has one corner 89 removed so as to provide a circular face having a center at shaft 70 and a radius slightly in excess of the distance from shaft 70 to bifurcation 72. Such construction assures that the influence exerted on balance member 68 by electromagnet 84 is substantially constant. The core 88 has a flattened end portion 90 which is aligned such that its lower flat face is substantially parallel to the top surface of balance member 68. Around core 88 is wound a coil of wire 92 which when energized will produce a magnetic field which urges balance member 68 to rotate in a direction opposite that caused by spring 78.

The operation of our pulse counter is as follows: with coil 92 de-energized, spring 78 causes balance member 68 acting through pin 76 to urge pallet lever 58 against banking pin 64. Such action causes pallet stone 62 to engage escape wheel 54 and prevent the latter's rotation. When coil 92 is energized balance member 68 is caused to rotate and, acting through pin 74, to urge pallet lever 58 against banking pin 66. Such action permits escape wheel 54 to rotate by an amount corresponding to one-half the distance between adjacent teeth on its periphery. Pallet stone 60 prevents any further rotation. When coil 92 is subsequently de-energized, spring 78 urges balance member 68 back to the original position, such that pallet stone 60 releases escape wheel 54 and pallet stone 62 retards the rotation of escape wheel 54 after an amount of rotation corresponding to one-half the distance between adjacent teeth on the periphery of escape wheel 54. Because the entering face 60a is modified to prevent locking engagement between escape wheel 54 and pallet stone 60, the energy required from spring 78 is very small and the spring 78 need not be biased strongly with the result that the power required by coil 92 is minimized. Thus, for each electrical pulse fed to coil 92, two "ticks" of the watch occur. Since the hands on the dial of the watch respond to the rotation of the gears which transmit the power from the main spring to escape wheel 54, the hands will be caused to rotate with the gears in a conventional manner. Because a normal watch is arranged to "tick" five times per second as indicated on the dial and because one pulse to coil 92 causes two "ticks," the movement of the hands of the watch corresponding to one minute will indicate that 150 pulses have been fed into coil 92. It should be obvious to those skilled in the art that the gear ratios within the watch and the calibration of the dial of the watch may be modified in any desired fashion to produce a different relationship between the indication on the dial and the number of pulses fed to coil 92. Thus, it is seen that we have provided a pulse counter which requires very little energy from the pulse source since the major portion of the energy used by the pulse counter comes from the main spring of the watch. The foregoing characteristic of our pulse counter makes it suitable for use with our amplifier shown in FIGURE 3. If the load 52 of FIG- URE 3 is replaced by the coil 92 of FIGURE 4 the pulse counter will indicate the number of times the heart beats while being worn by a human. The amplifier of FIGURE 3 may be constructed using transistors of type 2N535 and two 625 type Mallory Mercury batteries used to supply power in which case the heart beats may be counted for a continuous period in excess of 72 hours. An amplifier can be constructed which weighs only 1 ounce and which occupies only about .67 cubic inch. Such amplifier will provide the requisite 30-milliwatt pulses of 5 millisecond duration to operate the pulse counter.

When our pulse counter is used in conjunction with our amplifier to count human heart beats, the watch containing the pulse counter may be worn on the wrist and the amplifier may be carried in the pocket of the user. Thus, the apparatus is completely portable and will offer no interference with the normal activities of the user. Because of the action of multivibrator 28, the system is extremely insensitive to noise and, because the normal balance of the watch mechanism is preserved by providing balance member 68, the system is insensitive to mechanical shock.

While one embodiment of our invention has been shown and described, it will be apparent that various adaptations and modifications may be made without departing from the scope of the following claims.

We claim:
1. Apparatus for counting repetitive electrical pulses comprising
    a watch movement having an escape wheel in cooperative relationship with a pallet lever, said pallet lever including a right pallet stone and a left pallet stone, said left pallet stone including means to prevent a locking engagement between said left pallet stone and said escape wheel, means for producing a magnetic field in accordance with said electrical pulses, said field producing means having a coil of wire wound on a metallic core, a pivotable balance member oscillatably responsive to the field of said field producing means, means for biasing said balance member against the field produced by said field producing means, and means for operatively connecting said balance member to said pallet lever.

2. Apparatus for counting repetitive electrical pulses comprising
    a watch movement having an escape wheel in cooperative relationship with a pallet lever, means for producing a magnetic field in accordance with said electrical pulses, said field producing means having a coil of wire wound on a metallic core, a pivotable balance member oscillatably responsive to the field of said field producing means and having two juxtaposed projections, said balance member disposed such that said projections are astraddle said pallet lever, and means for biasing said balance member against the field produced by said field producing means.

3. Apparatus according to claim 2 in which said pallet lever has
    a right pallet stone and a left pallet stone, said left pallet stone including means to prevent a locking engagement with said escape wheel.

References Cited by the Examiner
UNITED STATES PATENTS

| | | | |
|---|---|---|---|
| 844,010 | 2/07 | Fischer | 58—27 |
| 1,884,547 | 10/32 | Bower | 58—23 |

MILTON KAUFMAN, *Primary Examiner.*

BROUGHTON G. DURHAM, *Examiner.*